United States Patent
Wei

(10) Patent No.: US 9,762,894 B2
(45) Date of Patent: Sep. 12, 2017

(54) 3D DISPLAY METHOD

(71) Applicant: BOE Technology Group Co., Ltd., Beijing (CN)

(72) Inventor: Wei Wei, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 14/354,341

(22) PCT Filed: Dec. 16, 2013

(86) PCT No.: PCT/CN2013/089525
§ 371 (c)(1),
(2) Date: Apr. 25, 2014

(87) PCT Pub. No.: WO2015/024343
PCT Pub. Date: Feb. 26, 2015

(65) Prior Publication Data
US 2015/0070478 A1  Mar. 12, 2015

(30) Foreign Application Priority Data

Aug. 19, 2013  (CN) .......................... 2013 1 0361690

(51) Int. Cl.
*H04N 13/04* (2006.01)
(52) U.S. Cl.
CPC ..... *H04N 13/0422* (2013.01); *H04N 13/0409* (2013.01); *H04N 13/0415* (2013.01)
(58) Field of Classification Search
CPC .... G02B 27/2214; G02B 27/60; G03B 35/18; H04N 13/0409; H04N 13/0415; H04N 13/0422; H04N 13/0475
See application file for complete search history.

(56) References Cited

U.S. PATENT DOCUMENTS 5,991,073 A * 11/1999 Woodgate et al. ........... 359/462
7,619,815 B2 * 11/2009 Nam .................. H04N 13/0409
                                                348/51
(Continued)

FOREIGN PATENT DOCUMENTS

CN        1746725 A        3/2006
CN        2929757 Y        8/2007
(Continued)

OTHER PUBLICATIONS

Notification of First Office Action from Chinese Patent Office for priority application CN201310361690.9 mailed Feb. 16, 2015 with English translation.
(Continued)

*Primary Examiner* — Bryan Earles
(74) *Attorney, Agent, or Firm* — Haug Partners LLP

(57) ABSTRACT

The present invention provides a 3D display method, including: when display is driven, setting two adjacent sub-pixels in one row of sub-pixels as one group of sub-pixels so that every two adjacent groups of sub-pixels display different types of single-eye images, two sub-pixels in each group of sub-pixels display the same type of single-eye images and each sub-pixel belongs to only one group of sub-pixels; or, setting two adjacent sub-pixels other than the first and the last sub-pixels in one row of sub-pixels as one group of sub-pixels so that every two adjacent groups of sub-pixels display different types of single-eye images, two sub-pixels in each group of sub-pixels display the same type of single-eye images, each sub-pixel belongs to only one group of sub-pixels and the first and the last sub-pixels display single-eye images, types of which are different from those displayed by their adjacent sub-pixels, respectively.

9 Claims, 4 Drawing Sheets

| 1 | 1 | 2 | 2 | 1 | 1 | 2 | 2 | 1 | 1 | 2 | 2 |
|---|---|---|---|---|---|---|---|---|---|---|---|
| 2 | 1 | 1 | 2 | 2 | 1 | 1 | 2 | 2 | 1 | 1 | 2 |
| 2 | 1 | 1 | 2 | 2 | 1 | 1 | 2 | 2 | 1 | 1 | 2 |
| 2 | 2 | 1 | 1 | 2 | 2 | 1 | 1 | 2 | 2 | 1 | 1 |
| 1 | 2 | 2 | 1 | 1 | 2 | 2 | 1 | 1 | 2 | 2 | 1 |
| 1 | 2 | 2 | 1 | 1 | 2 | 2 | 1 | 1 | 2 | 2 | 1 |

(56) References Cited

U.S. PATENT DOCUMENTS

| | | | | |
|---|---|---|---|---|
| 2004/0165264 A1* | 8/2004 | Uehara | ............ | H04N 13/0409 359/462 |
| 2004/0169919 A1* | 9/2004 | Uehara | ............ | G02B 27/2214 359/443 |
| 2005/0225502 A1 | 10/2005 | Nam et al. | | |
| 2008/0204455 A1* | 8/2008 | Allio | ................ | G02B 27/2214 345/427 |
| 2009/0278936 A1 | 11/2009 | Pastoor et al. | | |
| 2012/0182407 A1* | 7/2012 | Yoshida | ......................... | 348/54 |
| 2012/0200677 A1 | 8/2012 | Saishu et al. | | |
| 2013/0114135 A1* | 5/2013 | Lin | .................. | H04N 13/0409 359/464 |
| 2014/0002897 A1* | 1/2014 | Krijn | ............... | H04N 13/0404 359/463 |
| 2014/0049622 A1* | 2/2014 | Tsurumi | ............ | H04N 13/0409 348/54 |
| 2014/0063213 A1* | 3/2014 | Tsuchihashi | ....... | H04N 13/0404 348/59 |

FOREIGN PATENT DOCUMENTS

| | | |
|---|---|---|
| CN | 102472898 A | 5/2012 |
| CN | 102857774 A | 1/2013 |
| CN | 202975543 U | 6/2013 |
| CN | 103424874 A | 12/2013 |
| JP | 2007-003941 A | 1/2007 |
| JP | 2010-7787 | 1/2010 |
| JP | 2011-7757 | 1/2011 |
| JP | 2012-018245 A | 1/2012 |
| JP | 2012-163709 | 8/2012 |
| JP | 2012-212079 | 11/2012 |
| JP | 2012-242809 A | 12/2012 |
| JP | 2012-248979 | 12/2012 |
| KR | 2007-0089137 A | 8/2007 |
| WO | WO 2012/161075 | 11/2012 |

OTHER PUBLICATIONS

Notice of Preliminary Rejection from Korean Patent Office for corresponding application KR 10-2014-7011817 dated Apr. 21, 2015 with English translation.

Notification of the Second Office Action from the Chinese Patent Office for priority application 201310361690.9 dated Jun. 16, 2015 with English translation.

International Search Report issued by SIPO, acting as the ISA, for international application PCT/CN2013/089525 mailed Jul. 9, 2014.

Written Opinion issued by SIPO, acting as the ISA, for international application PCT/CN2013/089525 mailed Jul. 9, 2014 with English translation.

Extended European Search Report from European Patent Office for corresponding European application 13848106.4 dated Dec. 10, 2015.

First Office Action issued in corresponding Japanese Application No. 2016-535304 dated May 31, 2017.

* cited by examiner

3D DISPLAY METHOD

This application is a 371 of PCT/CN2013/089525 filed on Dec. 16, 2013, which claims priority benefits from Chinese Patent Application Number 201310361690.9 filed Aug. 19, 2013, the disclosure of which is incorporated herein by reference.

FIELD OF THE INVENTION

The present invention relates to the field of display technology, in particular, relates to a 3D display method.

BACKGROUND OF THE INVENTION

Currently, 3D image sources for naked eyes are very scarce, whereas 3D image sources for eyeglasses increase rapidly. Therefore compatibility with the 3D image sources for eyeglasses facilitates to promote the development of naked-eye stereoscopic display.

The existing naked-eye products mostly employ two views (i.e., images of the same object shot from two different angles of view, generally one of the images being a left-eye image and the other of the images being a right-eye image). Formats of 3D image sources in the left-and-right format include a frame packing format, a side-by-side format, a top-bottom format, etc; additionally, 3D image sources in the left-and-right format of such as a frame sequential format, a checkerboard format are further included. These image sources are all referred to as a two-view image source. Different types of single-eye images (i.e., viewpoint images shot from different angles of view) of a two-view image source are respectively input to odd columns and even columns of a display device, and light passes through the grating (i.e., a slit grating) shown in FIG. 1 so that the images are magnified at a viewing area, thereby presenting naked-eye stereoscopic display.

In FIG. 1, according to the fact that ratios of corresponding sides of two similar triangles are equal to each other, the following two equations can be derived:

$$\frac{f}{n \cdot s} = \frac{subp}{l}$$
$$\frac{p}{2subp} = \frac{s}{s+f}$$

and the following equation is derived from the above two equations:

$$p = \frac{2subp}{1 + n \cdot subp/l}$$

where, f is the distance between the grating and a light-outgoing surface of a display panel, s is the distance between the eyes of a person and the grating, l is the pupil distance of the person, subp is the width of a sub-pixel in the display panel, and p is an actual pitch of the grating (i.e. the distance between straight lines where centerlines are located, wherein the centerlines are centerlines of light-transmissive stripes on the grating along the length direction) (in the above three equations, it is assumed that a horizontal pitch of the grating is equal to the actual pitch of the grating). Light from the images are magnified at a viewing area having a width of l by the grating through adjusting the parameters of f, s, and p in the above equations (generally, subp and l being unchanged).

As shown in FIG. 2, since light emitted from each sub-pixel of a display device interferes with each other to form dark-and-light stripes (i.e., Moire fringes) when the light passes through a black matrix, a color filter matrix, and a grating array, a viewer will see a relatively serious phenomenon of Moire fringe, thereby affecting effect of stereoscopic display.

SUMMARY OF THE INVENTION (I) Technical Problem to be Solved

The technical problem to be solved by the present invention is how to mitigate the phenomenon of Moire fringe generated when an existing 3D image source in the left-and-right format is used to perform naked-eye 3D display.

(II) Technical Solutions

In order to solve the above technical problem, the present invention provides a 3D display method, including: when display is driven, setting two adjacent sub-pixels in one row of sub-pixels as one group of sub-pixels so that every two adjacent groups of sub-pixels display different types of single-eye images, two sub-pixels in each group of sub-pixels display the same type of single-eye images and each sub-pixel belongs to only one group of sub-pixels; or, setting two adjacent sub-pixels other than the first sub-pixel and the last sub-pixel in one row of sub-pixels as one group of sub-pixels so that every two adjacent groups of sub-pixels display different types of single-eye images, two sub-pixels in each group of sub-pixels display the same type of single-eye images each sub-pixel belongs to only one group of sub-pixels, and the first sub-pixel and the last sub-pixel display single-eye images, types of which are different from those displayed by their adjacent sub-pixels, respectively.

Wherein, driving row 3i+1, setting two adjacent sub-pixels in this row as one group of sub-pixels so that every two adjacent groups of sub-pixels display different types of single-eye images, two sub-pixels in each group of sub-pixels display the same type of single-eye images and each sub-pixel belongs to only one group of sub-pixels; and driving sub-pixels of column j in the sub-pixels of rows 3i+2 and 3i+3 as well as sub-pixel of column j−1 in the sub-pixels of row 3i+1 such that the sub-pixels of column j and the sub-pixel of column j−1 display the same type of single-eye images, where j≥2, sub-pixels of the first column in the sub-pixels of rows 3i+2 and 3i+3 as well as sub-pixel of the last column in the sub-pixels of row 3i+1 display the same type of single-eye images, where i≥0, and both i and j are integers.

Wherein, as for two adjacent rows 3i+1, sub-pixels of the same column display different types of single-eye images.

Wherein, in a case where s, subp and l remain constant, adjusting f according to the following equations such that at least two of the single-eye images are viewed in the width range of pupil distance:

$$\frac{f}{n \cdot s} = \frac{2subp}{l}$$
$$\frac{p'}{4subp} = \frac{s}{s+f}$$

-continued $$p' = \frac{4 \cdot l \cdot subp}{l + 2n \cdot subp}$$

where, f is a distance between a grating and a light-outgoing surface of a display panel, s is a distance between eyes of a person and the grating, l is a pupil distance of the person, subp is a width of a sub-pixel in the display panel, p' is a horizontal pitch of the grating, and n is a refractive index of a medium between a color-film substrate and the grating.

Wherein, the 3D display method further including: adjusting φ such that a range of φ is 0<φ<90°, in this case, the following equation holds:

$$p = p' \times \sin \phi$$

where, φ is an included angle between the grating and a row direction of sub-pixels, and p is an actual pitch of the grating.

(III) Advantageous Effects

Using the 3D display method according to the present invention, a phenomenon of Moire fringe can be effectively mitigated when an existing 3D image source in the left-and-right format is used to perform naked-eye 3D display.

DETAILED DESCRIPTION OF THE EMBODIMENTS

The present invention will be further described below in detailed with reference to the drawings and embodiments. The following embodiments are for the purpose of explaining the present invention, but not intended to limit the scope of the present invention.

Figure 1:
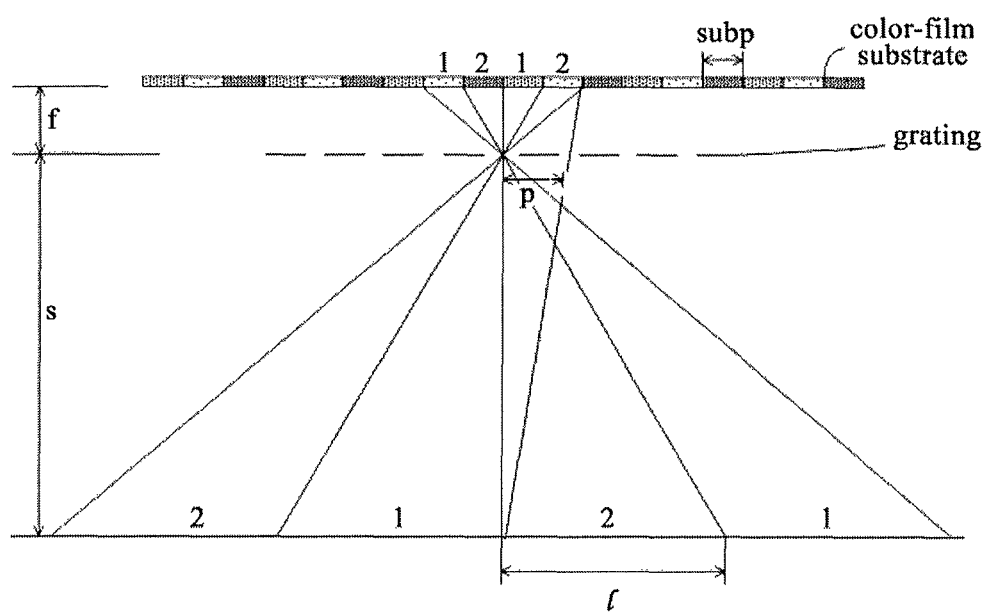
FIG. 1 is a schematic diagram of principle of using an existing two-view display manner to perform naked-eye 3D display.
Figure 2:
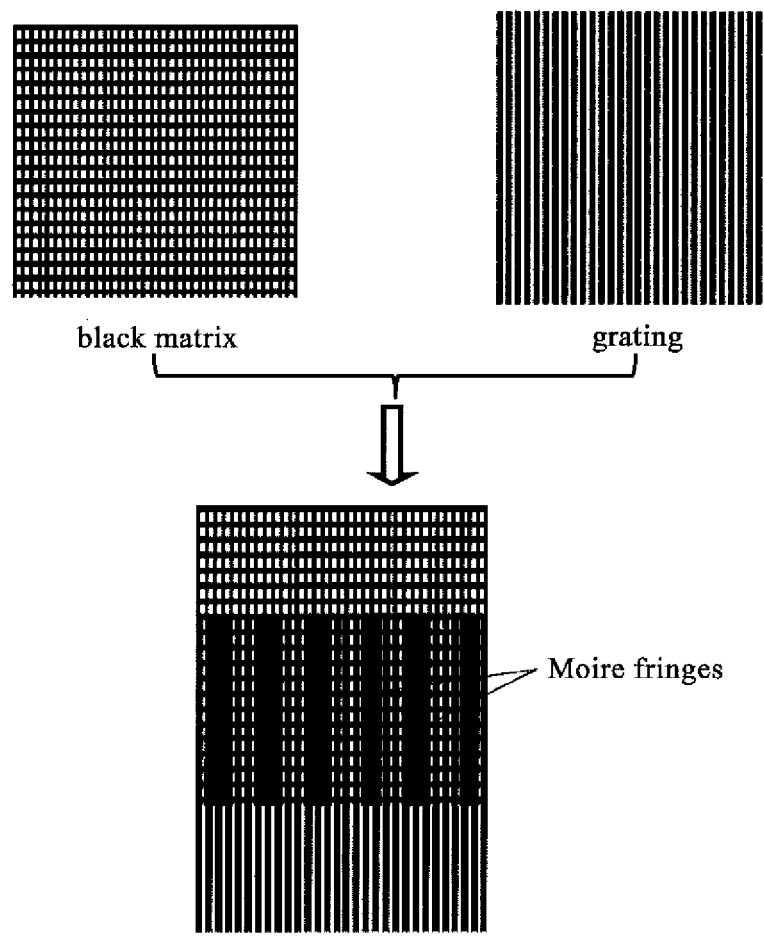
FIG. 2 is a schematic diagram of principle of generating Moire fringes during 3D display.
Figures 3, 4:
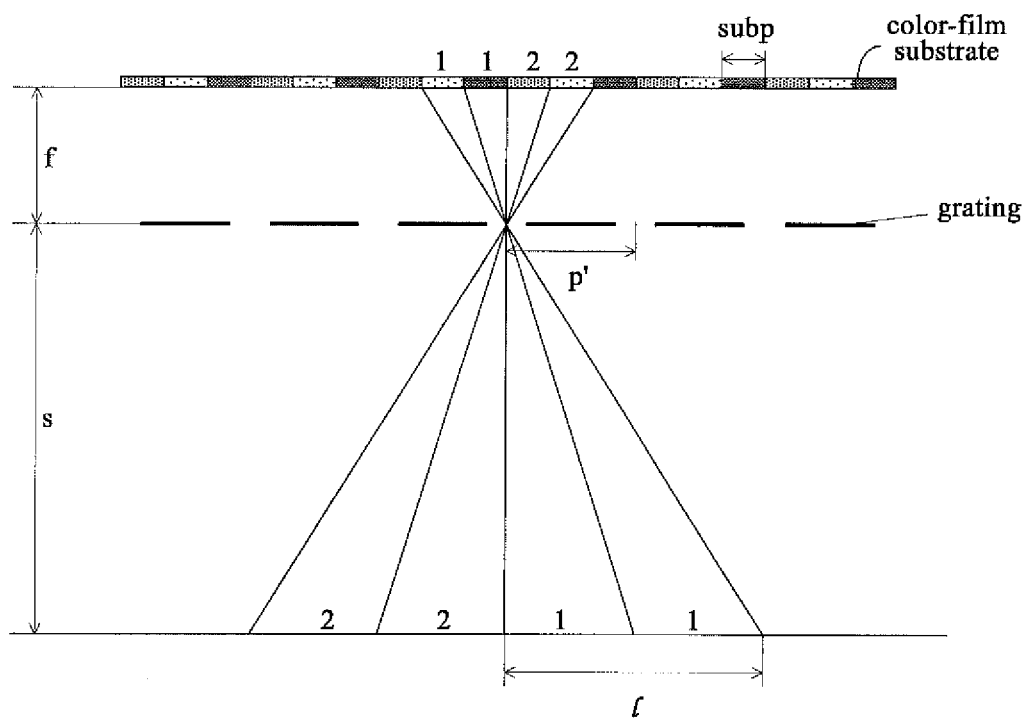
FIG. 3 is a schematic diagram of the image arrangement according to the present invention.
FIG. 4 is a schematic diagram of principle of using the display manner according to the present invention to perform naked-eye 3D display.

In order to mitigate the phenomenon of Moire fringe generated when a conventional two-view display manner are used to perform naked-eye 3D display, the present invention provides a new manner of arranging two views as shown in FIG. 3. In the FIG. 3, a rectangle with reference number of 1 and a rectangle with reference number of 2 denote a left-eye image and a right-eye image, respectively. When display is driven, corresponding sub-pixels are driven in the manner of arranging two views to display images. A specific driving manner is as follows:

When display is driven, two adjacent sub-pixels in one row of sub-pixels are set as one group of sub-pixels so that every two adjacent groups of sub-pixels display different types of single-eye images (i.e., a left-eye image and a right-eye image), two sub-pixels in each group of sub-pixels display the same type of single-eye images and each sub-pixel belongs to only one group of sub-pixels. Or, two adjacent sub-pixels other than the first sub-pixel and the last sub-pixel in one row of sub-pixels are set as one group of sub-pixels so that every two adjacent groups of sub-pixels display different types of single-eye images, two sub-pixels in each group of sub-pixels display the same type of single-eye images, each sub-pixel belongs to only one group of sub-pixels and both of the first sub-pixel and the last sub-pixel display single-eye images, types of which are different from those displayed by their adjacent sub-pixels, respectively.

Each of the rectangle with reference number of 1 and the rectangle with reference number of 2 in FIG. 3 is regarded as one sub-pixel in a display device. For example, every two adjacent groups in the first row display different types of single-eye images, and sub-pixels in the same group display the same type of single-eye images, i.e., 1 1 2 2 1 1 2 2 . . . ; two adjacent groups other than the first sub-pixel and the last sub-pixel in the second row display different types of single-eye images, and sub-pixels in the same group display the same type of single-eye images; and the first sub-pixel and the last sub-pixel display single-eye images, types of which are different from those displayed by their adjacent sub-pixels, respectively, i.e., 2 1 1 2 2 1 1 2 2 1 1 2.

Wherein, row 3i+1 is driven, two adjacent sub-pixels in this row are set as one group of sub-pixels so that every two adjacent groups of sub-pixels display different types of single-eye images, two sub-pixels in each group display the same type of single-eye images and each sub-pixel belongs to only one group, and driving sub-pixels of column j in the sub-pixels of rows 3i+2 and 3i+3 as well as sub-pixel of column j−1 in the sub-pixels of row 3i+1 so that the sub-pixels of column j and the sub-pixel of column j−1 display the same type of single-eye images, where j≥2, sub-pixels of the first column in the sub-pixels of rows 3i+2 and 3i+3 as well as sub-pixel of the last column in the sub-pixels of row 3i+1 display the same type of single-eye images, where i≥0, and both i and j are integers. Wherein, as for two adjacent rows 3i+1, corresponding sub-pixels of the same column display different types of single-eye images.

Each of the rectangle with reference number of 1 and the rectangle with reference number of 2 in FIG. 3 is regarded as one sub-pixel in a display device. In FIG. 3, every two adjacent groups in the first row display different types of single-eye images, and sub-pixels in the same group display the same type of single-eye images, i.e., 1 1 2 2 1 1 2 2 . . . . The types of single-eye images displayed in the second and third rows move rightward by a sub-pixel relative to those displayed in the first row, i.e., 2 1 1 2 2 1 1 . . . . Moreover, the single-eye images displayed by the first sub-pixels in the second and third rows and the single-eye image displayed by the last sub-pixel in the first row are of the same type. Corresponding sub-pixels in the same column in the fourth and first rows of sub-pixels display different types of single-eye images.

Compared with the existing arrangement manner of arranging two views, a display panel is driven in the above arrangement manner of arranging two views of the present invention to display images so that two adjacent sub-pixels display the same type of single-eye images. The shape of a grating, which matches with the above arrangement manner of arranging two views of the present invention, is calculated according to the arrangement manner, reducing width of dark-and-light stripes, which are generated due to light from sub-pixels interfering with each other when the light passes through a black matrix, a color filter matrix, and a grating array. The width is reduced so that human eyes cannot identify it, thus the phenomenon of Moire fringe is effectively mitigated.

In the 3D display method according to the above arrangement manner of two views, in order to be able to view a picture normally in the case that the distance between a person and a display screen as well as a pupil distance remain unchanged (i.e., s and l in the following equations remain unchanged), the distance f between a grating and a light-outgoing surface of a display panel is adjusted according to the following equations, such that at least two of the single-eye images are viewed in the width range of pupil distance l.

$$\frac{f}{n \cdot s} = \frac{2subp}{l}$$

$$\frac{p'}{4subp} = \frac{s}{s+f}$$

$$p' = \frac{4 \cdot l \cdot subp}{l + 2n \cdot subp}$$

As shown in FIG. 4, f is the distance between the grating and a light-outgoing surface of a display panel, s is the distance between the eyes of a person and the grating, l is the pupil distance of the person, subp is the width of a sub-pixel in the display panel, p' is a horizontal pitch of the grating, and n is the refractive index of a medium between a color-film substrate and the grating, n is generally in the range of 1.4 to 1.6 and, for example, may be 1.5.

In FIG. 4, 1 1 2 2 on the topmost are a left-eye image and a right-eye image of a 3D image source in the left-and-right format. After passing through a grating, the left-eye image and the right-eye image are respectively projected into viewing areas corresponding to the left eye and the right eye. l is the pupil distance of a person. A viewer can see a stereoscopic image when the left eye of the viewer moves within viewing areas 2 2 in the lower part of FIG. 4 and the right eye of the viewer moves within viewing areas 1 1 in the lower part of FIG. 4. Preferably, the maximum distance for human eyes moving leftward and rightward is l (otherwise, the distance for human eyes moving leftward and rightward is less than l) when exact two images are seen in the width range of pupil distance l, in which case the angle of view reaches a maximum value while it is guaranteed to see a 3D image.

Figure 5:
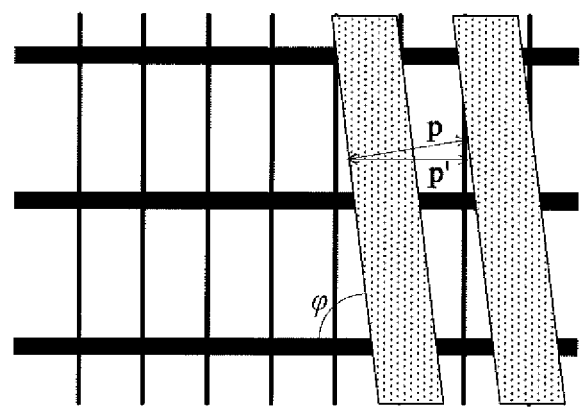
FIG. 5 is a schematic diagram of the planar structure of a 3D grating.
Figure 6:
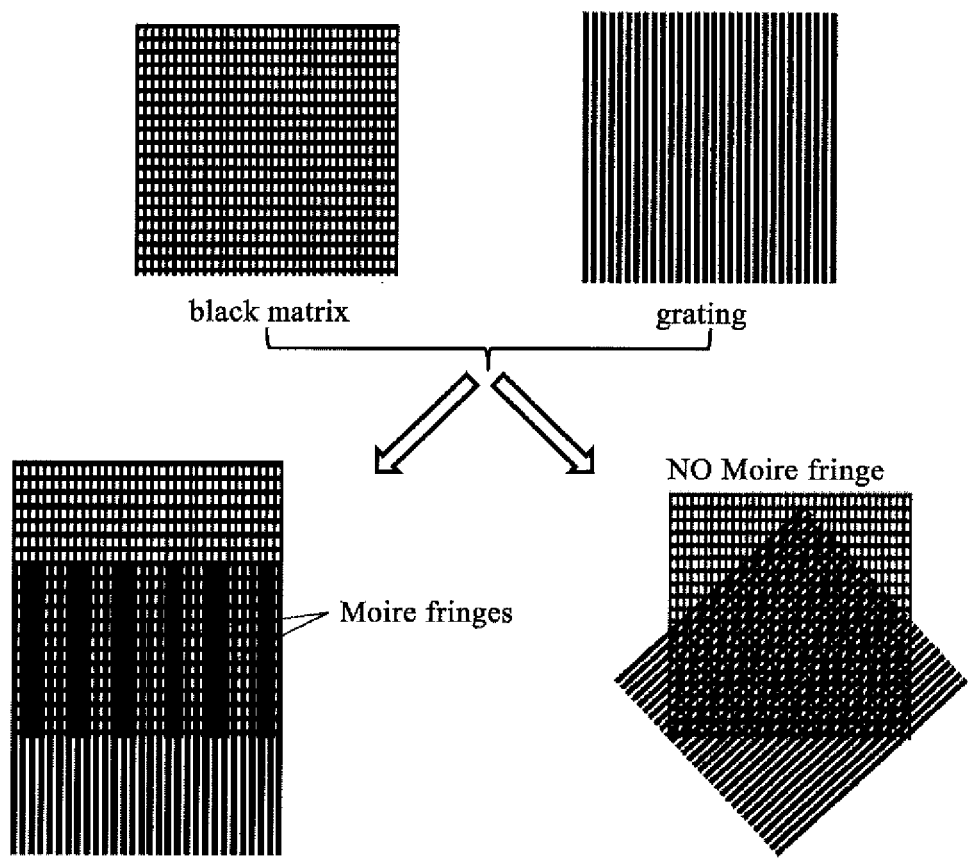
FIG. 6 is an elementary diagram of mitigating Moire fringes after the included angle between a grating and a row direction of sub-pixels is adjusted.

As shown in FIGS. 5 and 6, in order to further mitigate the phenomenon of Moire fringe, the following step is further included: adjusting φ such that the range of φ is 0<φ<90°, for example, is 70°~85°. In this case, the following equation holds:

$$p = p' \times \sin \phi$$

where, φ is the included angle between a grating (a length direction of light-transmissive stripes on the grating) and a row direction of sub-pixels, and p is an actual pitch of the grating (when φ=90°, the actual pitch p of the grating=the horizontal pitch p' of the grating). As shown in FIG. 6, φ is adjusted such that the grating and the row direction of sub-pixels form a certain angle, thus the phenomenon of Moire fringe is mitigated.

The arrangement manner of arranging two views and the adjustment of the grating as described above change the tilt angle φ of the grating and f. Width of dark-and-light stripes which are generated due to light emitted from sub-pixels interfering with each other when the light passes through a black matrix, a color filter matrix, and a grating array is further reduced. And the width is reduced so that that human eyes cannot identify it, thus the phenomenon of Moire fringe is further mitigated.

The foregoing embodiments are only for the purpose of explaining the present invention, but not intended to limit the present invention. Various modifications and variations can be easily made by a person of ordinary skilled in the art without departing from the spirit and the scope of the present invention. Thus, all of the equivalent technical solutions thereof also fall within the scope of the present invention. Therefore, the protection scope of the present invention should be defined by the claims.

What is claimed is:

1. A 3D display method, wherein: when display is driven, setting two adjacent sub-pixels in one row of sub-pixels as one group of sub-pixels so that every two adjacent groups of sub-pixels display different types of single-eye images, two sub-pixels in each group of sub-pixels display the same type of single-eye images, and each sub-pixel belongs to only one group of sub-pixels; and setting two adjacent sub-pixels other than the first sub-pixel at a beginning position and the last sub-pixel at an end position in each of two adjacent rows of sub-pixels next to said one row of sub-pixels as one group of sub-pixels so that every two adjacent groups of sub-pixels display different types of single-eye images, each of the two adjacent rows comprising three contiguous groups, two sub-pixels in each group of sub-pixels display the same type of single-eye images, each sub-pixel belongs to only one group of sub-pixels, and the first sub-pixel and the last sub-pixel display single-eye images, types of which are different from those displayed by their adjacent sub-pixels, respectively.

2. The 3D display method according to claim 1, wherein: driving row 3i+1, setting two adjacent sub-pixels in this row as one group of sub-pixels so that every two adjacent groups of sub-pixels display different types of single-eye images, two sub-pixels in each group of sub-pixels display the same type of single-eye images and each sub-pixel belongs to only one group; and driving sub-pixels of column j in the sub-pixels of rows 3i+2 and 3i+3 as well as sub-pixel of column j−1 in the sub-pixels of row 3i+1, such that the sub-pixels of column j in the sub-pixels of rows 3i+2 and 3i+3 and the sub-pixel of column j−1 in the sub-pixels of row 3i+1 display the same type of single-eye images, for all columns where j≥2; sub-pixels of the first column in the sub-pixels of rows 3i+2 and 3i+3 as well as sub-pixel of the last column in the sub-pixels of row 3i+1 display the same type of single-eye images, for all rows where i≥0, and both i and j are integers.

3. The 3D display method according to claim 2, wherein, as for two adjacent rows 3i+1, sub-pixels of the same column display different types of single-eye images.

4. The 3D display method according to claim 1, wherein: in a case where s, subp and l remain constant, adjusting f according to the following equations such that at least two of the single-eye images are viewed in the width range of pupil distance:

$$\frac{f}{n \cdot s} = \frac{2subp}{l}$$

-continued $$\frac{p'}{4 subp} = \frac{s}{s+f}$$

$$p' = \frac{4 \cdot l \cdot subp}{l + 2n \cdot subp}$$

where, f is a distance between a grating and a light-outgoing surface of a display panel, s is a distance between eyes of a person and the grating, l is a pupil distance of the person, subp is a width of a sub-pixel in the display panel, p' is a horizontal pitch of the grating, and n is a refractive index of a medium between a color-film substrate and the grating.

5. The 3D display method according to claim 4, wherein, the 3D display method further including: adjusting $\phi$ such that a range of $\phi$ is 0<$\phi$<90°, in this case, the following equation holds:

$p = p' \times \sin \phi$ where, $\phi$ is an included angle between the grating and a row direction of sub-pixels, and p is an actual pitch of the grating.

6. The 3D display method according to claim 2, wherein: in a case where s, subp and l remain constant, adjusting f according to the following equations such that at least two of the single-eye images are viewed in the width range of pupil distance:

$$\frac{f}{n \cdot s} = \frac{2 subp}{l}$$

$$\frac{p'}{4 subp} = \frac{s}{s+f}$$

$$p' = \frac{4 \cdot l \cdot subp}{l + 2n \cdot subp}$$

where, f is a distance between a grating and a light-outgoing surface of a display panel, s is a distance between eyes of a person and the grating, l is a pupil distance of the person, subp is a width of a sub-pixel in the display panel, p' is a horizontal pitch of the grating, and n is a refractive index of a medium between a color-film substrate and the grating.

7. The 3D display method according to claim 3, wherein: in a case where s, subp and l remain constant, adjusting f according to the following equations such that at least two of the single-eye images are viewed in the width range of pupil distance:

$$\frac{f}{n \cdot s} = \frac{2 subp}{l}$$

$$\frac{p'}{4 subp} = \frac{s}{s+f}$$

$$p' = \frac{4 \cdot l \cdot subp}{l + 2n \cdot subp}$$

where, f is a distance between a grating and a light-outgoing surface of a display panel, s is a distance between eyes of a person and the grating, l is a pupil distance of the person, subp is a width of a sub-pixel in the display panel, p' is a horizontal pitch of the grating, and n is a refractive index of a medium between a color-film substrate and the grating.

8. The 3D display method according to claim 6, wherein, the 3D display method further including: adjusting $\phi$ such that a range of $\phi$ is 0<$\phi$<90°, in this case, the following equation holds:

$p = p' \times \sin \phi$ where, $\phi$ is an included angle between the grating and a row direction of sub-pixels, and p is an actual pitch of the grating.

9. The 3D display method according to claim 7, wherein, the 3D display method further including: adjusting $\phi$ such that a range of $\phi$ is 0<$\phi$<90°, in this case, the following equation holds:

$p = p' \times \sin \phi$ where, $\phi$ is an included angle between the grating and a row direction of sub-pixels, and p is an actual pitch of the grating.

* * * * *